March 24, 1936.   H. C. HASLAM   2,034,946
EGG GRADING SCALE
Filed Dec. 17, 1934
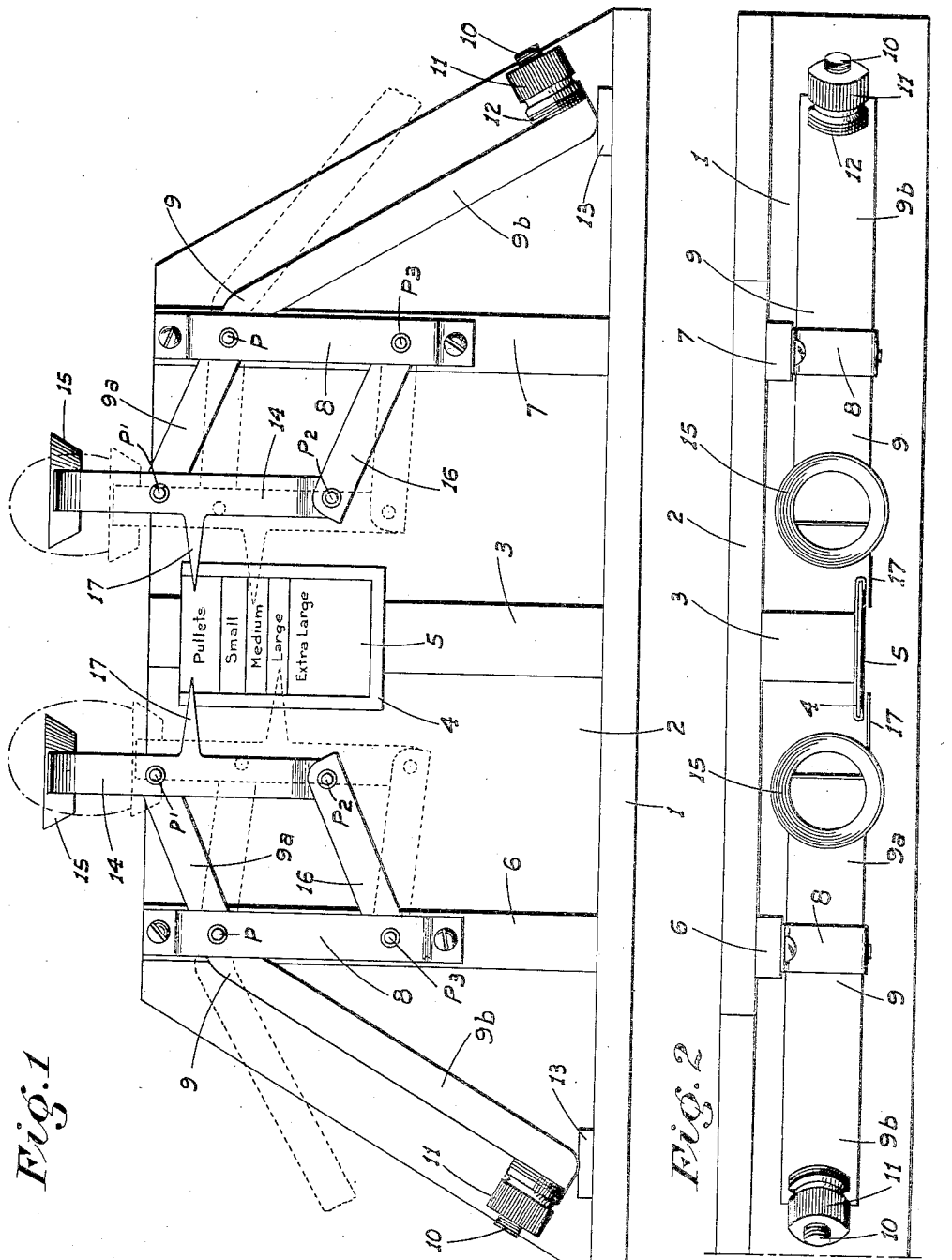
INVENTOR
H. C. Haslam
BY
ATTORNEY Patented Mar. 24, 1936

2,034,946

UNITED STATES PATENT OFFICE 2,034,946

EGG GRADING SCALE

Henry C. Haslam, Chowchilla, Calif.

Application December 17, 1934, Serial No. 757,875

2 Claims. (Cl. 265—61)

This invention relates to scales and is directed particularly to scales for grading eggs as to size. In the egg merchandising industry it is not only necessary to grade the eggs prior to marketing them, but the eggs are often graded prior to setting them for hatching.

In egg graders, it may be stated that the size of eggs depends on their weight, since the specific gravity of the contents of all eggs is the same, irrespective of their size. Grading for size is therefore determined by weighing the eggs.

The procedure of grading eggs, as practiced today especially by poultry associations, not only involves the use of expensive scales but also requires a great deal of handling of each egg during the weighing or grading process, which results in great time loss of labor. This is due primarily to the fact that a single egg may be weighed twice because of the fact that two sets of non-unitary scales are commonly used. The egg is first placed on one scale and if too heavy for that scale, it is removed and placed on another scale which is adapted to measure the weight and consequently the size of the heavier eggs. Thus, in many cases, an egg has to be weighed twice before it is placed into the shipping container.

It is therefore my principal object to provide an egg scale which may be used to weigh and grade eggs regardless of their particular weight variation. By thus providing a scale capable of weighing every egg, the number of times which an egg must be handled is greatly reduced and labor cost lessened.

When my scale is employed, the person weighing the egg need only take the egg in the hand, hold it before a conveniently located candling window, then place the egg on the scale and determine its weight and size, and then remove the egg and place it in the proper container.

It is also my object to provide, as a single unit, a scale device having a pair of identical but independent functioning scales—the pointer of each scale registering on a single grade indicating card mounted intermediate the two scales. By providing such a dual unit, the user may take an egg in each hand, candle the same and then simultaneously place the eggs on the two scales for weighing and grading. This feature also increases the speed with which one person may grade a quantity of eggs.

As a further object, I provide my scale unit with a removable grade indicating card in order that the scales may be adapted, by merely replacing the card, to register egg grades according to different government schedules as may be provided from time to time.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a side elevation of my improved egg scale unit illustrating in dotted lines an operative position of the scales when a pair of eggs is being graded.

Figure 2 is a top plan of the scale unit.

Referring now more particularly to the characters of reference on the drawing, the numeral 1 indicates a base plate provided with an upstanding back plate 2 mounted at right angles thereto. Secured to the face of the back plate 2 in a central and vertical position is a supporting member 3. Mounted on the support 3 relatively close to the top thereof, is an outwardly facing card holder 4 provided with suitable grooves to engage a grade indicating card 5. Scale supporting members 6 and 7 are mounted in vertical position on the face of the back plate 2 in spaced relation on each side of the supporting member 3.

Mounted on the supporting members 6 and 7 are scales; both being identical in structure and having their pointers in facing relation over the card 5.

Both scales being identical, a description of one will suffice for both, their relative relation to each other having already been set out.

The scale structure comprises a U-shaped bracket 8 mounted on the corresponding scale supporting member 6 or 7. Pivotally secured at P between the bracket 8 and the supporting member is a scale beam 9 in the form of a bell crank having one relatively short leg 9a and one relatively long leg 9b. This scale beam is formed of sheet metal in channel shape.

The outer end of the leg 9b is provided with a threaded stud 10 and a removable nut 11. Washers 12 on the stud and held in place by the nut provide for proper balance of the scale according to different weighing or grading requirements. A stop member 13 of cushioning material upon which the leg of the scale beam rests is formed on the base plate 1.

Pivoted at P1 to the outer end of the leg 9a is a pair of spaced vertical arms 14 which extend upwardly and terminate in an egg cup 15. An arm 16, formed in channel shape, is pivoted at P2 to the lower ends of the arms 14 and at the other end is pivoted at P3 between the U-shaped bracket 8 and the corresponding supporting member below the leg 9a and parallel thereto.

A pointer 17 is formed on the outer arm 14 and extends out over the grade indicating card 5 in order to indicate the weight and consequent grade or size of the egg in the cup.

In use, an egg is placed in the cup 15 and the weight thereof causes the leg 9b to lift up from the stop 13 as a counterbalance, the pointer then indicating the corresponding size of the egg on the card. The leg 9a and arm 16 are at all times parallel to each other thereby always maintaining the arms 14 and egg cup 15 in a vertical position.

The scales of course may be adjusted by varying the number of washers or shims 12, and the grade indicating card 5 may be removed and another inserted when the schedule of weights for the various grades or sizes of eggs is changed.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. An egg grader comprising a support, a scale beam pivoted intermediate its ends on the support, said scale beam being formed in the shape of a bell crank, a vertical arm pivoted on one end of the scale beam, an egg cup on the upper end of said arm, another arm pivoted at one end to the lower end of said first named arm and pivoted at the other end to the support and in parallel relation to that end of the scale beam to which said first named arm is pivoted, a pointer on said first named arm, and a grade indicating card mounted on the support and on which the pointer reads.

2. An egg grader comprising a support, a scale beam pivoted intermediate its ends on the support, a vertical arm pivoted on one end of the scale beam, an egg cup on the upper end of said arm, another arm pivoted at one end to the lower end of said first named arm and pivoted at the other end to the support and in parallel relation to that end of the scale beam to which said first named arm is pivoted, a pointer on said first named arm, and a grade indicating card mounted on the support and on which the pointer reads.

HENRY C. HASLAM.